US006448747B1

(12) United States Patent
Lestician

(10) Patent No.: US 6,448,747 B1
(45) Date of Patent: Sep. 10, 2002

(54) ELECTRICITY POD CONTROLLER DEVICE

(75) Inventor: Guy J. Lestician, Township of Lower Smithfield, County of Monroe, PA (US)

(73) Assignee: Power Saver Designs, Inc., East Stroudsburg, PA (US)

(*) Notice: Subject to any disclaimer, the term of this patent is extended or adjusted under 35 U.S.C. 154(b) by 0 days.

(21) Appl. No.: 09/644,132

(22) Filed: Aug. 23, 2000

(51) Int. Cl.[7] .................... G05F 1/70; H02M 1/12

(52) U.S. Cl. .................... 323/276; 363/39; 323/205; 361/118

(58) Field of Search .................... 323/274, 275, 323/276, 205, 206, 208; 363/39, 40, 44–47; 361/117, 118, 119

(56) References Cited

U.S. PATENT DOCUMENTS

| | | | | |
|---|---|---|---|---|
| 4,845,580 A | | 7/1989 | Kitchens | 361/91 |
| 4,870,528 A | | 9/1989 | Harford | 361/56 |
| 5,105,327 A | | 4/1992 | Wohlforth | 361/56 |
| 5,384,696 A | * | 1/1995 | Moran et al. | 363/40 |
| 5,528,123 A | | 6/1996 | Hutchison | 323/205 |
| 5,640,314 A | | 6/1997 | Glasband et al. | 363/36 |
| 5,646,458 A | | 7/1997 | Bowyer et al. | 307/67 |
| 5,880,677 A | | 3/1999 | Lestician | 340/825.06 |
| 5,892,667 A | | 4/1999 | Glasband et al. | 363/36 |
| 6,009,004 A | | 12/1999 | Swamy | 363/47 |
| 6,014,017 A | | 1/2000 | Weinhold et al. | 323/207 |
| 6,058,035 A | | 5/2000 | Madenokouji et al. | 363/95 |
| 6,384,583 B1 | * | 5/2002 | Lestician | 323/276 |

* cited by examiner

*Primary Examiner*—Jessica Han
(74) *Attorney, Agent, or Firm*—Kenneth P. Glynn, Esq.

(57) ABSTRACT

The present invention electricity pod controller device includes:

(a) in-parallel connection to an incoming power supply of a facility including a hot line and a neutral line, and at least one ground. There are components connected between the hot line and the neutral line in the following order;

(b) at least one front metal oxide varistor line transient voltage surge suppressor having a predetermined capability to suppress undesired power spikes;

(c) at least one capacitor of predetermined capacitance;

(d) at least two chokes in the form of inductor/metal oxide varistor transformers;

(e) at least a second capacitor of its own predetermined capacitance;

(f) at least one back metal oxide varistor having a predetermined capability. In preferred embodiments, the metal oxide varistor may be a plurality of varistors in parallel.

20 Claims, 3 Drawing Sheets

ELECTRICITY POD CONTROLLER DEVICE

BACKGROUND OF THE INVENTION

1. Field of the Invention

The present invention relates to conservation of electrical energy consumption by commercial, industrial, residential and all other energy consumers using retrofitted control devices which are attached at the incoming breakers to a facility and operate to increase efficiencies in a three stage process.

2. Information Disclosure Statement

The following references are examples of the prior art relating to control of electrical energy consumption:

U.S. Pat. No. 4,163,218 relates to an electronic control system for controlling the operation of a plurality of electrical devices which are energized from AC power lines which includes a single, central unit connected to the power lines, which further includes a central transceiver means for transmitting an encoded oscillating signal of one frequency onto the power lines, a central encoding means for encoding the oscillating signal with an encoded signal in synchronization with the frequency of the AC power for selective control of electrical devices, and a central control means connected to the encoding means for selecting the electrical device to be controlled and its desired state. The invention further includes unitary switch units respectively interconnected between power lines and each electrical device being operative for both local and centralized control of the electrical device with the local control and the centralized control placing the electrical device in respective opposite states from each other, each switch unit including a switch transceiver means for receiving the encoded oscillating signal from the power lines, a switch decoding means coupled to the switch transceiver means for detecting the encoded signal, a switch control means connected to the switch decoding means for setting the selected electrical devices to the desired state, and a local control means for selectively locally operating the electrical device independently of the central unit and placing the electrical device in a state opposite from that which it was placed by the central unit.

U.S. Pat. No. 4,845,580 describes a spike elimination circuit for A.C. and D.C. power sources which comprises two gas tube and/or two semiconductor voltage limiting devices before a Bandpass Filter. The Bandpass Filter consists of 2 capacitors to ground an inductor in series with the line. The spike eliminator can be portable, mobile, or hard wired for the protection of home controls and electronics, telecommunications, commercial and industrial controls and the computer field and others.

U.S. Pat. No. 4,870,528 describes a surge suppressor which comprises a first series circuit having a first inductance and a first alternating voltage limiter, including at least a first capacitance and a bidirectionally conductive rectifying circuit for charging the first capacitance, coupled between first and second input terminals for limiting surge currents and voltage excursions coupled to first and second load output terminals. The first alternating voltage limiter further comprises a sensing circuit for sensing at least one of the charging current supplied to and the voltage developed across the first capacitance. An auxiliary energy storage circuit and a normally open switching device responsive to the sensing circuit are provided for coupling the auxiliary energy storage circuit across the first capacitance during high energy surge conditions.

U.S. Pat. No. 5,105,327 describes a power conditioner for AC power lines which has a choke and capacitor coupled in series across the power lines. The choke comprises a coil terminating in a line, with the line looped back through the coil. The power lines are thereby balanced to provide greater operating efficiency. Capacitors and transient suppressors (e.g., varistors) are used for transient suppression and power factor correction.

U.S. Pat. No. 5,420,741 relates to an arrangement for obtaining flux rate information in a magnetic circuit including passive means connected across a flux rate sensor for implementing control of said flux rate. The passive means being a tuned magnetic flux rate feedback sensing and control arrangement wherein impedance is tuned and the energy loss characteristic is adjustable. The selection of inductance and capacitance values provides tuning and the selection of resistance affects the energy loss characteristics.

U.S. Pat. No. 5,432,710 is directed to an energy supply system for supplying, in system interconnection, power at a power receiving equipment from a power plant and power generated by a fuel cell to a power consuming installation, and supplying heat generated by the fuel cell to a heat consuming installation. This system includes an operation amount computing device for computing an amount of operation of the fuel cell to minimize an equation y=aXL+bXM+cXN, in response to an energy demand of the power consuming installation and heat consuming installation. A control device controls the fuel cell to satisfy the amount of the operation computed. The system supplies energy in optimal conditions with respect to the cost borne by an energy consumer, consumption of primary energy, and release of environmental pollutants. Energy is effectively used from the standpoint of the energy consumer and a national point of view.

U.S. Pat. No. 5,436,513 relates to an information handling system which is described as having a power supply and having a switching circuit that switches a plurality of energy sources between series and parallel couplings. Associated with the switching circuit is a voltage level detecting circuit for monitoring the voltage level of the energy sources. A processor for controlling the information handling system responds to the voltage level detecting circuit and in the event of a low voltage condition, the processor activates the switching circuit to switch the energy sources and from a series to a parallel coupling. Alternatively, the processor responds to other inputs or conditions for actuating the switching circuit.

U.S. Pat. No. 5,459,459 is directed to an algorithm for implementation in a meter register and a reading device. In the one embodiment, the invention enables selecting a display table to be read from the register, updating the billing read date and time in the register, reversing the order in which load profile data is transmitted from the register to the reader, specifying the number of load profile intervals to be read from the register, and specifying the number of intervals to skip when reading from the register.

U.S. Pat. No. 5,462,225 relates to an apparatus and method for controlling energy supplied to a space conditioning load and for overriding a load control operation in response to measuring certain space temperatures within a closed environment. The load control apparatus includes a control device connected to an electrical distribution network and to a space/conditioning load and a temperature sensing device connected to the control device. The control device conducts a load shedding operation to control distribution of electrical energy to the space conditioning load in response to command signals supplied by a remote command center. The temperature sensing device operates to override the load shedding operation by outputting a control override signal to the control device in response to sensing certain space temperatures within the closed environment. If the temperature control device is connected to an air conditioning system, the temperature sensing device causes the control device to terminate the load shedding operation prior to expiration of a selected time period in response to measuring a space temperature that exceeds a maximum space temperature limit. In contrast, if the temperature control device is connected to a forced air heating system, the temperature sensing device causes the control device to terminate the load shedding operation when a measured space temperature drops below a minimum space temperature limit. The maximum space temperature limit is greater than the control temperature setpoint of a thermostat that controls the space conditioning operations, whereas the minimum space temperature limit is less than the control temperature setpoint.

U.S. Pat. No. 5,483,672 relates to a communication system, where a communication unit may conserve source energy when it is inactive in the following manner. The control channel is partitioned into a predetermined number of windows and a system window which are transmitted on the control channel in a round robin manner. When the communication unit registers with the communication system, it is assigned to a window group. The communication unit then monitors only the system window to determine whether the window group that its been assigned to is also assigned to one of the predetermined number of windows. When the window that has been assigned to the window group is being transmitted to the control channel, the communication unit activates to monitor that window. Once the window is no longer being transmitted, the communication unit deactivates until the system window is being transmitted or the window assigned to the window group is being transmitted.

U.S. Pat. No. 5,495,129 relates to an electronic device for multiplexing several loads to the terminals of a source of alternating electrical energy. The source of alternating electrical energy is coupled by electromagnetic flux to the loads by using primary excitation windings and connects to the terminals of the source of alternating electrical energy and secondary windings respectively corresponding to the number of loads. The secondary windings are at least partially coupled to the primary winding and are each connected to the terminals of a load. The coupling is inhibited by auxiliary winding which are each totally coupled with the secondary winding. The inhibition function is controlled in order to inhibit all the magnetic couplings except for one and this particular one changes as a function of the respective load to be coupled to the source of alternating electrical energy.

U.S. Pat. No. 5,512,831 relates to a system for testing electrochemical energy conversion and storage devices includes means for sensing the current from the storage device and varying the load across the storage device in response to the current sensed. The system is equally adaptable to batteries and fuel cells. Means is also provided to sense system parameters from a plurality of locations within the system. Certain parameters are then stored in digital form for archive purposes and certain other parameters are used to develop control signals in a host processor.

U.S. Pat. No. 5,517,188 is directed to a programmable identification apparatus, and associated method, includes a transceiver and a transponder. The transponder is powered by the energy of a transceiver transmit signal generated by the transceiver and includes a programmable memory element. A coded sequence which uniquely identifies the transponder is stored in the programmable memory element and, when the transponder is powered, the transponder generates a transponder signal which includes the coded sequence stored in the programmable memory element, once modulated by circuitry of the transponder. When the transceiver transmit signal generated by the transceiver circuitry is of certain signal characteristics, the coded sequence stored in the programmable element is erased, and a substitute coded sequence, which also forms a portion of the transceiver transmit signal, is stored in the programmable memory element. Storage of the coded sequence in the programmable memory element is, hence, effectuated merely by application of a transceiver transmit signal of certain characteristics to the transponder.

U.S. Pat. No. 5,528,123 measures the total line current in a power cord which is used to energize both a power factor corrected system and non-power factor corrected AC loads. The power factor control loop of the power factor corrected system is then driven to correct the power factor of total line current in the power cord ideally to approach unity.

U.S. Pat. No. 5,640,314 relates to a symmetrical ac power system which provides a balanced ac output, whose maximum voltage with respect to a reference ground potential is one-half the ac output voltage, and which is derived from a single phase ac source through the use of an isolation transformer having a center-tapped secondary winding. The center tap is connected to the output power load circuit as a ground reference potential with respect to the symmetrical ac output so as to constitute the reference ground potential for the power supply and load. Since symmetrical ac power is applied to the load by the system, reactive load currents, other power artifacts, EMI and RFI emissions and other interference and noise components ordinarily resulting from the application of conventional ac power to the load are reduced or eliminated by appearing as equal inversely phased signal elements which cancel one another. In order to maximize the performance of the symmetrical power system, the isolation transformer has a bifilar-wound secondary winding.

U.S. Pat. No. 5,646,458 describes a UPS (uninterruptible power system) which includes an UPS power conditioning unit that provides conditioned AC power to a critical load. The UPS power conditioning unit includes a variable speed drive that operates in response to AC utility power or to a standby DC input by providing a motor drive signal. The UPS power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the UPS power conditioning unit and the standby DC power source are initially operated in response to the utility AC power, the flywheel motor-generator storing kinetic energy in a rotating flywheel. When an outage occurs, the rotating flywheel continues to operate the flywheel motor-generator of the standby DC power source, causing the production of AC power which is rectified and provided as standby DC power to operate the variable speed drive of the UPS power conditioning unit until either the utility AC power outage is over or a standby emergency generator is brought on line.

U.S. Pat. No. 5,880,677 relates to a system that monitors and controls electrical power consumption that will be retrofitted to a typical consumer electrical power arrangement (typical arrangement-electrical feed line from a provider, a meter, a circuit breaker and individual input wiring to a plurality of electrical devices, appliances and outlets). The system includes a control unit which receives information from an electromagnetic pickup device from which real time electrical consumption is determined over very short periods of time. The control unit has a main data processing and storage processor for retaining information and it may include a communication microprocessor for sending signals to corresponding modules. The electromagnetic pickup device uniquely measures the electromagnetic flux emanating at each output wire from each of the individual circuit breakers in a breaker box. The modules have filters which release electrical power to the individual electrical devices, appliances and outlets at a controlled, economic rate.

U.S. Pat. No. 5,892,667 describes a symmetrical ac power system which provides a balanced ac output, whose maximum voltage with respect. to a reference ground potential is one-half the ac output voltage, and which is derived from a single phase ac source through the use of an isolation transformer having a center-tapped secondary winding. The center tap is connected to the output power load circuit as a ground reference potential with respect to the symmetrical ac output so as to constitute the reference ground potential for the power supply and load. Since symmetrical ac power is applied to the load by the system, reactive load currents, other power artifacts, EMI and RFI emissions and other interference ad noise components ordinarily resulting from the application of conventional ac power to the load are reduced or eliminated by appearing as equal inversely phased signal elements which cancel one another. In order to maximize the performance of the symmetrical power system, the isolation transformer has a bifilar-wound secondary winding.

U.S. Pat. No. 6,009,004 discloses a new single-phase passive harmonic filter for one or more nonlinear loads. The filter improves the total system performance by drastically reducing the line side current harmonics generated by nonlinear loads. The filter includes two inductive portions across one of which is connected a tuning capacitor. The parallel combination of one inductive portion with the tuning capacitor forms a series tuned filter configuration while the second inductive portion is used for harmonic attenuation. A shunt capacitor is employed for shunting higher order harmonic components. A single-phase passive voltage regulator provides the needed voltage bucking to prevent over voltage at the load terminals of the filter. The filter provides an alternate path for the harmonic currents generated by nonlinear loads. The over voltage caused by the increased capacitive reactance is controlled by either capacitor switching or by the use of the passive voltage regulator or a combination of the two. Capacitor switching is dependent upon load conditions.

U.S. Pat. No. 6,014,017 describes a method and an apparatus for power factor correction for a non-ideal load, which is supplied from a mains power supply, by a compensation device which is electrically connected in parallel with the load and has a pulse converter with at least one capacitive store. A transfer function space vector is calculated as a function of a determined mains power supply voltage space vector, a mains power supply current space vector, a compensator current space vector and of an intermediate circuit voltage which is present on the capacitive store. As a result of which the pulse converter generates a compensator voltage space vector on the mains power supply side as a function of the intermediate circuit voltage. A compensator current space vector, that keeps the undesirable reactive current elements away from the mains power supply, is thus obtained via a coupling filter that is represented as a compensator inductance.

U.S. Pat. No. 6,058,035 describes a method wherein after starting the input of a switching signal to a booster circuit whose boosting rate is changeable in accordance with the duty ratio of the inputted switching signal and calculating the output power of an invertor circuit, which is connected to the subsequent stage of the booster circuit, from the output current of the invertor circuit, the target voltage after boosting by the booster circuit is obtained based on the output power. If the actual output voltage of the booster circuit is lower than the target voltage, the duty ratio of the above switching signal is increased, and if higher, the duty ratio of the above switching signal is decreased.

Notwithstanding the above prior art, there are, no teachings or suggestions that would render the present invention anticipated or obvious.

SUMMARY OF THE INVENTION

The present invention is an electricity pod controller device, which includes connection for connecting the device in parallel with an incoming power supply to a facility, i.e. a home, factory, office, institution, etc.; a first stage component, a second state component and a third stage component. The first stage is adapted to recognize electromagnetic interference, and to respond thereto by suppressing line transient voltage surges, and thus includes at least one line transient voltage surge suppressor (TVSS). The TVSS may be one or more metal oxide varistors and is preferably a plurality of in-parallel metal oxide varistors.

The second stage component includes at least one variable inductor to regulate the total harmonics distortion (THD) and thus enhance power factor correction. This would include chokes (transformers) and storage. The third stage component includes hardware to provide power to maintain phase regulation to incoming power, thus, to maintain true phase relationship between voltage and current at times of increased power demands. The third stage component includes at least one power storage and discharge element.

In some embodiments, the present invention is arranged so that the first stage component, second stage component and third stage component operate in a single phase. In other embodiments, there are at least two sets of components, each set having a first stage component, a second stage component and a third stage component, such that the device operates as a two phase device. In yet other embodiments, the electricity pod controller device of the present invention has three sets of components, each set having a first stage component, a second stage component and a third stage component, wherein the device operates as a three phase device.

More specifically, preferred embodiments of the present invention electricity pod controller device include:

(a) connecting means for connection to an incoming power supply of a facility, for connection in parallel, including a hot line and a neutral line, and at least one ground, and has a number of important components connected between said hot line and said neutral line. They are connected in the following order travelling in a direction away from the connections;

(b) at least one front metal oxide varistor line transient voltage surge suppressor having a predetermined capability to suppress undesired power spikes ("front" is used to mean closer to the connection and "back" is used to mean further away from the connection);

(c) at least one capacitor of predetermined capacitance;

(d) at least two chokes in the form of inductor/metal oxide varistor transformers;

(e) at least a second capacitor of its own predetermined capacitance;

(f) at least one back metal oxide varistor having a predetermined capability. In preferred embodiments, the front metal oxide varistor is a plurality of varistors in parallel. It has been discovered that a plurality of smaller varistors having the same total capability as one larger varistor responds more quickly than one large varistor. For similar reasons, it is preferred that the back metal oxide varistor be a plurality of varistors in parallel. However, single large varistors may be used without exceeding the scope of the present invention In some embodiments, the components (b) through (f) above are arranged for operation as a single phase device, while in other embodiments, the components (b) through (d) are duplicated therein to form two connected sets thereof and are arranged for operation as a two phase device. In yet other embodiments, at least a portion of component (e) is duplicated.

In those embodiments where three phase operation is desired, the electricity pod controller device components (b) through (d) are at least triplicated therein and (e) and (f) are at least duplicated therein to form three connected sets thereof and are thus arranged for operation as a three phase device.

The electricity pod controller device of the present invention may further include at least one indicator lamp connection and lamp wired so as to illuminate when the device is functional and to not illuminate when the device is nonfunctional.

BRIEF DESCRIPTION OF THE DRAWINGS

The present invention should be more fully understood when the specification herein is taken in conjunction with the drawings appended hereto, wherein.

DETAILED DESCRIPTION OF THE PRESENT INVENTION

In a normal electrical power consumption situation, electricity is transmitted through power lines or transmission lines to a facility, e.g. the home, office, factory or other consumers, wherein the main line is typically connected to an electrical meter, and from the meter to a main breaker box (or, in earlier times, a main fuse box). Within the main breaker box, the main power line is connected to a plurality of individual circuit breakers which then lead to various power consumption devices such as heating, air conditioning, lighting and electrical outlets. While this arrangement works adequately to provide electrical power to the consumer, it is inefficient because many electrically powered devices and appliances consume more power than necessary and, additionally, they experience spikes, surges and phase shifts, which make the overall system inefficient and uneconomic.

The present invention relates to systems which are retrofitted to existing electrical power arrangements for the purpose of reducing unnecessary electrical power waste and losses by reducing or eliminating spikes, surges and phase problems. It is a totally self-sufficient device which is attached downstream from or at the last breaker of the system or the last breaker to be regulated.

Figure 1:
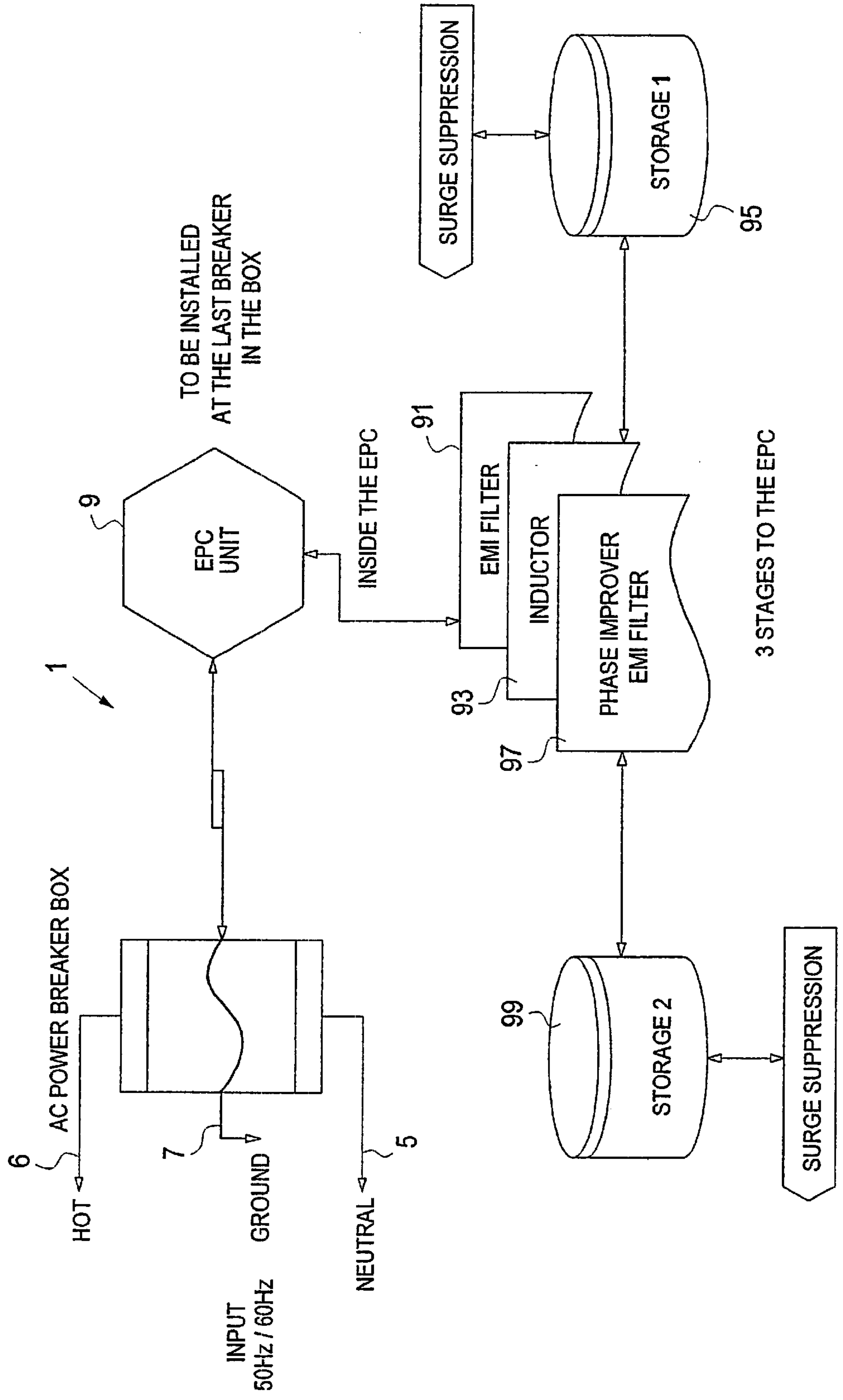
FIG. 1 shows a flow chart of the electricity pod controller of the present invention in symbolic form.

FIG. 1 illustrates a flow chart of one embodiment of an electricity pod controller of the present invention in symbolic representation. The diagram shows a flow chart 1. It includes connections to the breaker box including hot wire 3 and neutral wire 5. There is also a ground 7. The electricity pod controller unit 9, to be most efficient, is installed at the last breaker in the box of a facility in order to act upon all of the power flowing into the facility through those breakers.

Electricity pod controller unit 9 is shown to contain an electromagnetic interference filter 91, an inductor 93 with storage for surge suppression, and a phase improving EMI filter 97 with storage 99, also for surge suppression. This is designed to operate within the preferred range of 80 to 440 volts or even a broader range of 25 to about 500 volts of AC input at 30 to 80 kilohertz.

Figure 2:
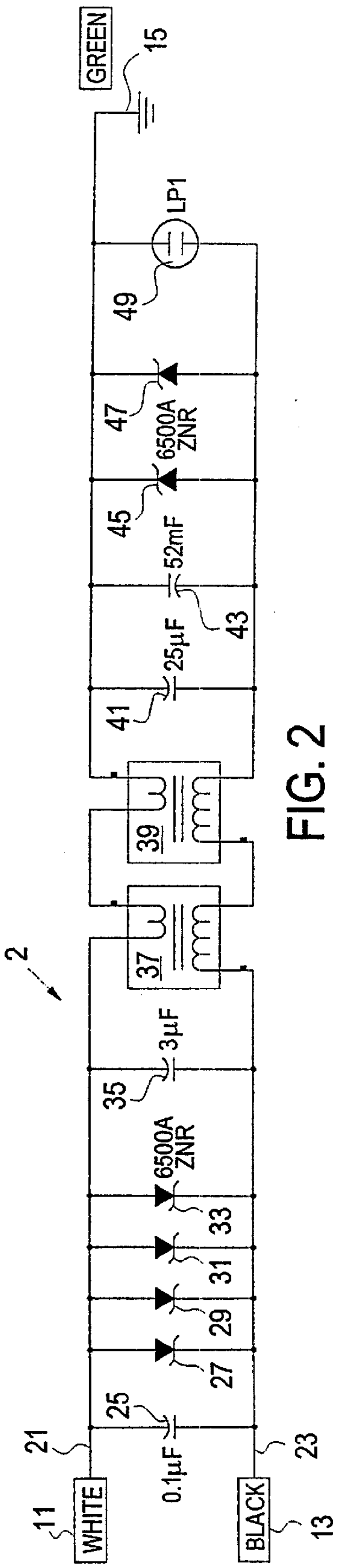
FIG. 2 shows a wiring diagram of one preferred embodiment of the present invention electricity pod controller for single phase operation.

FIG. 2 shows a wiring diagram of one preferred embodiment of the present invention electricity pod controller for single phase operation. There is a white contact 11 and a black contact 13 with ground 15 as shown. For simplicity, the various components are shown and are described as being wired between neutral line 21 and hot line 23 and are described sequentially herein in an order beginning at the connections 11 and 13 and moving outwardly or away from those connections.

Thus the components in the wiring diagram of FIG. 1 represent a single phase device and include a surge suppression-type capacitor 25 (in this case, 0.1 microfarads and in general about 0.001 to 1.0 microfarads) followed by a plurality of varistors 27, 29, 31 and 33. These act together as a surge suppressor and could be replaced by two larger varistors or one single very large varistor. Collectively, they have a capability of 80,000 joules (i.e. about 20,000 joules each) and preferably should be in the range of 10,000 to 20,000 or more joules. Dry film capacitor 35, in this case, has a capacity of 3 microfarads. This is followed by two chokes or transformers functioning as inductor/metal oxide varistor transformers. They each are set to operate at about 45 to 60 millihenries. Next, are liquid filled high intensity discharge capacitors 41 and 43 rated at 25 microfarads and 52 millifarads, respectively. Varistors 45 and 47 act together as back end surge suppressors., There is an optional lamp 49 which remains illuminated while device 2 is hooked up and functional, and which shuts down if device 2 is nonfunctional, a component fails, or the device is disconnected. This is also the case for the lamps described in conjunction with FIGS. 3 and 4 below.

Figure 3:
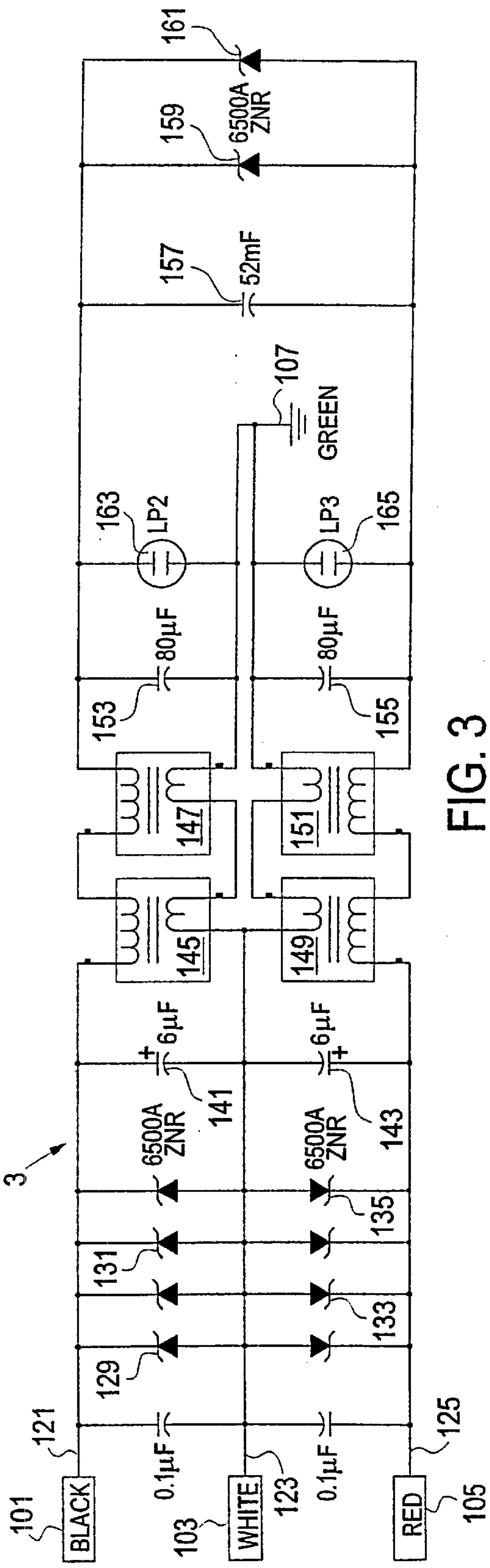
FIG. 3 illustrates a wiring diagram for another preferred embodiment of the present invention electricity pod controller for two phase operation; and, FIG. 4 shows a wiring diagram of yet another preferred embodiment of the present invention electricity pod controller for three phase operation.

FIG. 3 shows another wiring diagram for a two phase present invention device 3 which includes black connection 101, white connection 103 and red connection 105 with lines 121, 123 and 125, respectively, extending therefrom. There are two arrays of surge suppressor varistors typified by varistors 129 and 131 in the first set and 133 and 135 in the second set. These are followed by capacitors 141 and 143, each having a 6 microfarad capacitance. The first set of components also includes chokes 145 and 147 and the second set of components includes chokes 149 and 151. These are followed by capacitors 153 and 155, as shown, rated at 80 microfarads each. These are connected to indicator lamps 163 and 165 followed by ground 107. Connected between lines 121 and 125 are capacitor 157 at 25 microfarads and varistors 159 and 161.

Figure 4:
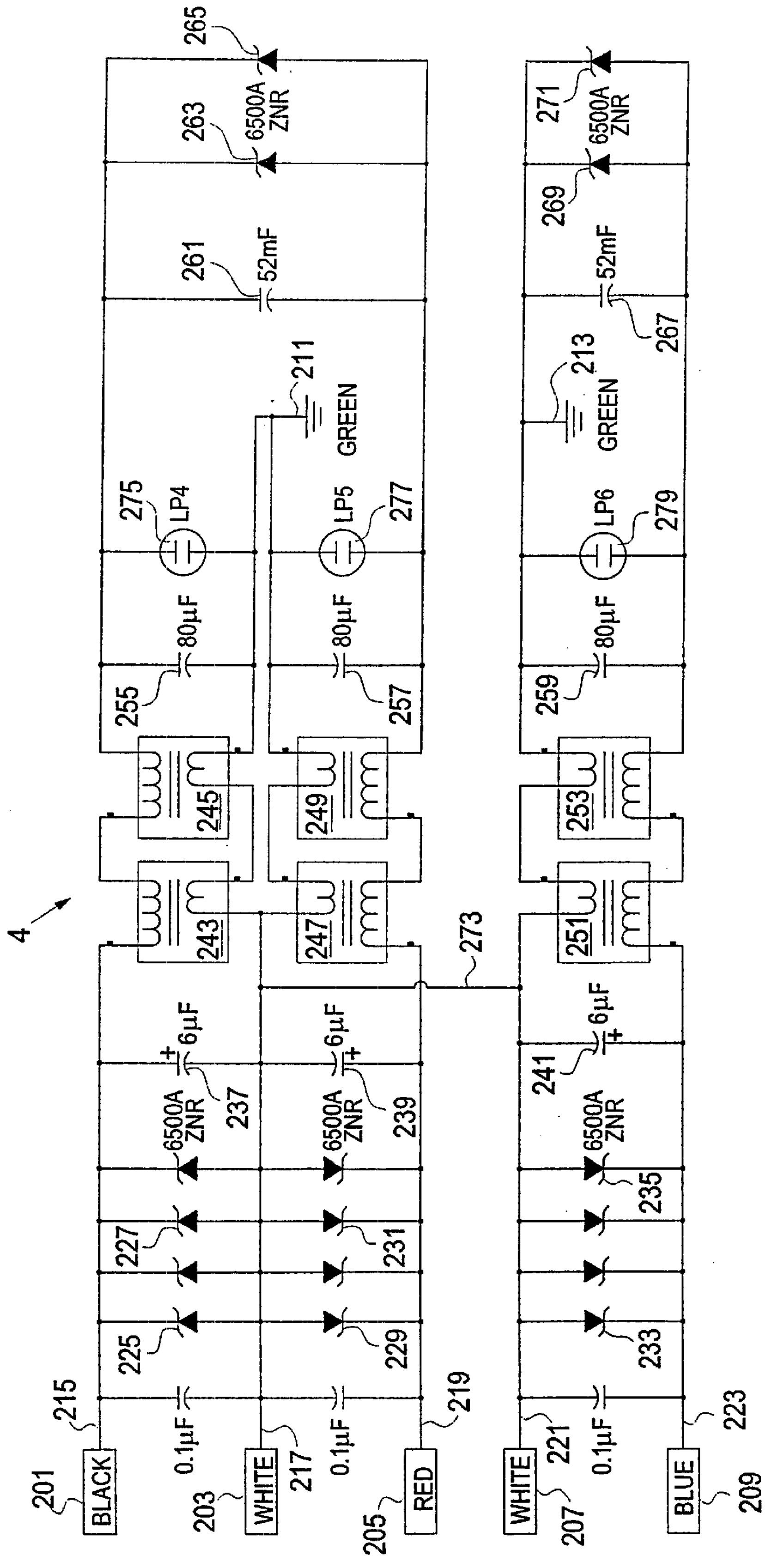

FIG. 4 illustrates a wiring diagram for a three phase present invention device which includes black connection 201, white connections 203 and 207, red connections 205 and blue connection 209, with lines 215, 217, 221, 219 and 223, respectively, extending therefrom. There are three arrays of surge suppressor varistors which are representatively illustrated by varistors 225 and 227 in the first set, 220, 229 and 231 in the second set and 233 and 235 in the third set. These are followed downstream by capacitors 287, 239 and 241, each having a 6 microfarad capacitance. A line 273 connects the third set of arrays with the first and second set by connecting white line 203 with white line 207. The first array or first set of components includes chokes 243 and 245, and the second set of components includes chokes 247 and 249, and the third set of components includes chokes 251 and 253. These are followed further downstream in each set by capacitors 255, 257 and 259, respectively. These are each 80 microfarad capacitors. Indicator lamps 275, 277 and 279, respectively, show the functioning or non-functioning status of each set of components to which it is connected. The first two sets of components are grounded by ground 211 and the third set of components is grounded by ground 213.

Moving further downstream (away from the connections) the first and second sets of components share a capacitor 261 (rated at 25 microfarads) followed by varistors 263 and 265. The third set of components has a capacitor 267 (also 25 microfarads) followed by varistors 269 and 271.

Obviously, numerous modifications and variations of the present invention are possible in light of the above teaching. It is therefore understood that within the scope of the appended claims, the invention may be practiced otherwise than as specifically described herein.

What is claimed is:

1. An electricity pod controller device, which comprises:

(a) connection means for connecting said device in parallel electrical connection with an incoming power supply to a facility;

(b) a first stage component, including identifying means to recognize electromagnetic interference, and means to respond thereto by suppressing line transient voltage surges, said first stage component also including at least one line transient voltage surge suppressor (TVSS);

(c) a second stage component, including at least one variable inductor to regulate the total harmonics distortion (THD) and thus enhance power factor correction; and, (d) a third stage component, including means to provide power to maintain phase regulation to incoming power, thus, to maintain true phase relationship between voltage and current at times of increased power demands, said third stage component including at least one power storage discharge means.

2. The electricity pod controller device of claim 1 wherein said first stage component, second stage component and third stage component operate a single phase.

3. The electricity pod controller device of claim 1 wherein there are at least two sets of components, each set having said first stage component, said second stage component and said third stage component, wherein said device operated as a two phase device.

4. The electricity pod controller device of claim 1, wherein there are three sets of components, each set having said first stage component, said second stage component and said third stage component, wherein said device operates as a three phase device.

5. An electricity pod controller device, which comprises:

(a) connecting means for connection to an incoming power supply of a facility, for connection in parallel, including a hot line and a neutral line, and at least one ground, and having the following components connected between said hot line and said neutral line, in the following order:

(b) at least one front metal oxide varistor line transient voltage surge suppressor having a predetermined number of joules capability to suppress undesired power spikes;

(c) at least one capacitor of predetermined capacitance;

(d) at least two chokes in the form of inductor/metal oxide varistor transformers;

(e) at least a second capacitor of its own predetermined capacitance;

(f) at least one back metal oxide varistor having a predetermined number of joules capability.

6. The electricity pod controller device of claim 5 wherein said at least one front metal oxide varistor is a plurality of varistors in parallel.

7. The electricity pod controller device of claim 5 wherein said at least one back metal oxide varistor is a plurality of varistors in parallel.

8. The electricity pod controller device of claim 5 wherein said components (b) through (f) are arranged for operation as a single phase device.

9. The electricity pod controller device of claim 8 wherein said at least one front metal oxide varistor is a plurality of varistors in parallel.

10. The electricity pod controller device of claim 8 wherein said at least one back metal oxide varistor is a plurality of varistors in parallel.

11. The electricity pod controller device of claim 5 wherein at least said components (b) through (d) are duplicated therein to form two connected sets thereof and are arranged for operation as a two phase device.

12. The electricity pod controller device of claim 11 wherein said at least one front metal oxide varistor is a plurality of varistors in parallel.

13. The electricity pod controller device of claim 11 wherein said at least one back metal oxide varistor is a plurality of varistors in parallel.

14. The electricity pod controller device of claim 11 wherein at least a portion of component (e) is duplicated.

15. The electricity pod controller device of claim 11 which further includes at least one indicator lamp connection and lamp wired so as to illuminate when said device is functional and to not illuminate when said device is non-functional.

16. The electricity pod controller device of claim 5 wherein said components (b) through (d) are at least triplicated therein and (e) and (f) are at least duplicated therein to form three connected sets thereof and are arranged for operation as a three phase device.

17. The electricity pod controller device of claim 16 wherein said at least one back metal oxide varistor is a plurality of varistors in parallel.

18. The electricity pod controller device of claim 16 wherein said at least one front metal oxide varistor is a plurality of varistors in parallel.

19. The electricity pod controller device of claim 16 which further includes at least one indicator lamp connection and lamp wired so as to illuminate when said device is functional and to not illuminate when said device is non-functional.

20. The electricity pod controller device of claim 5 which further includes at least one indicator lamp connection and lamp wired so as to illuminate when said device is functional and to not illuminate when said device is non-functional.

* * * * *